TWO-COLOR DISPLAY FROM LINE SEQUENTIAL COLOR RECORDING

Filed March 30, 1966

INVENTORS:
James Reekie,
Edward G. Thurston.
By Griffin and Branigan
Attys

April 22, 1969 J. REEKIE ET AL 3,440,341

TWO-COLOR DISPLAY FROM LINE SEQUENTIAL COLOR RECORDING

Filed March 30, 1966 Sheet 2 of 2

INVENTORS:
James Reekie,
Edward G. Thurston
By Griffin and Branigan
Attys 3,440,341
Patented Apr. 22, 1969

3,440,341

TWO-COLOR DISPLAY FROM LINE SEQUENTIAL COLOR RECORDING

James Reekie, Wilmette, and Edward G. Thurston, Chicago, Ill., assignors to Bell & Howell Company, Chicago, Ill., a corporation of Illinois Filed Mar. 30, 1966, Ser. No. 538,815
Int. Cl. H04n 5/44, 1/46, 9/02
U.S. Cl. 178—5.4 13 Claims

ABSTRACT OF THE DISCLOSURE

There is disclosed a method and apparatus for converting a standard NTSC color television signal to line sequential signals, recording the line sequential signals, and after playback, displaying the signals so that each signal is displayed during two consecutive line scan periods and two signals are displayed during each line scan period.

Figure 1:
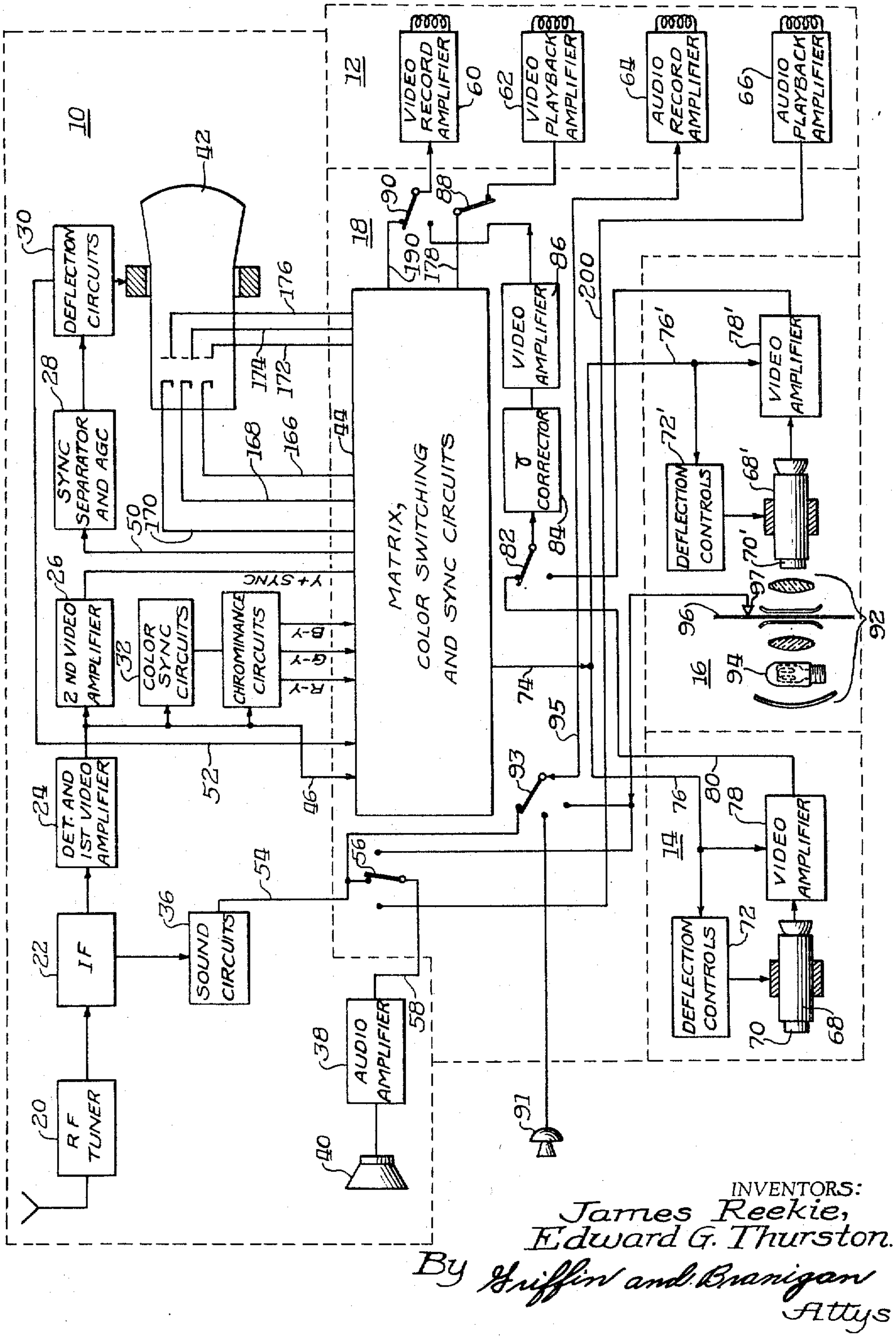

The present invention relates to methods and means for recording and subsequently playing back and displaying color video signals. More particularly, the present invention relates to a method and apparatus whereby standard NTSC broadcast signals are converted into line sequential form for recording on magnetic tape. Upon playback, each line of a color played back from the tape is displayed during two consecutive line scan intervals of the display device with two colors being displayed during each line scan interval. As used herein, the term line scan interval means the interval of time required for the beam of a cathode ray tube in a conventional television receiver to scan or display one horizontal line.

Line sequential color television systems are known in which a single gun tube of the Chromatron type writes each color line in sequence on a face plate consisting of closely spaced vertical stripes of red, green and blue phosphors. The particular color stripe the electron writing beam strikes is determined by a fine vertical wire deflecting grid adjacent to the fluorescent screen. For video recording purposes each line signal is recorded in sequence on a magnetic tape and replayed in this same fashion. Such systems have been limited in practice to a single color per line, line sequential display. Not only is such a display less effective in color blending than simultaneous tricolor displays, it is also usually reduced in brightness. This latter defect is especially severe when such a display is attempted with a conventional shadow mask display tube.

Field sequential color television systems are also known in which successive fields are sequentially displayed in red, green, and blue. However, since fields of a particular color occur only 20 times per second, it is obvious that a highly objectionable flicker is present in this system.

Up to now the only acceptable way of recording and replaying color television signals has been to record the whole composite signal on highly accurate video tape recorders and then process the composite signal upon replay in the same manner as the signal received from a remote broadcast station. Even very minor imperfections and phase changes introduced by the recorder result in unacceptable degradation of the color picture. Furthermore, these systems are extremely expensive thereby preventing widespread acceptance and use by the general public.

Accordingly, an object of this invention is to provide a novel method and apparatus for recording and subsequently replaying color television signals using relatively low cost, home type, video tape recorders including, for example, so called linear, fixed head recorders.

An object of this invention is to provide a novel method and apparatus for recording and replaying color television signals using any video tape recorder having the capability of recording black and white television signals.

In order to accomplish these objectives and overcome the difficulties present in prior art devices, the present invention employs a novel line sequential system in which two colors are displayed during each horizontal scan. When operating in the record mode to record signals broadcast from a remote station, the off-air NTSC signal is processed in a standard television receiver to produce the color difference signals $R-Y$, $G-Y$ and $B-Y$ and a composite luminance and sync signal, $Y+$sync. The color difference signals and the composite luminance and sync signal are matrixed to provide composite red, green, and blue video signals. One of these video signals is passed to a video tape recorder during each line scan interval. Thus, the NTSC signal is converted to a line sequential signal for recording.

Upon replay, two colors are written by the display device during each line scan interval. This is accomplished by reading the line sequential signals, R, G and B from the video tape in sequence and applying each color signal to the display device during two consecutive line scan intervals by applying each line sequential signal to the display device immediately upon reading it from the video tape and by also simultaneously applying it to a delay line which delays the signal for a period of time equal to one line scan interval before applying it to the color display device.

Accordingly, a further object of the invention is to provide a method and apparatus for converting an NTSC color signal to line sequential signals suitable for recording by means of a black and white video tape recorder.

Still another object of the invention is to provide a method and apparatus for recording and subsequently displaying color television signals by converting NTSC signals to line sequential signals, recording the line sequential signals, and subsequently playing back the recorded signals, each line sequential signal replayed from the tape being applied to the color display device during two consecutive line scan periods.

Yet another object of the invention is to provide a recording and display system including a video tape recorder for recording line sequential color signals, means for replaying the line sequential signals, means for immediately applying each replayed line sequential signal to a control electrode of a color display device, and means for delaying each replayed line sequential signal for an interval of time equal to one line scan interval of said display device before applying it to said control electrode.

A further feature of the invention is the provision of a novel video display system including a color video camera and/or a color film converter in combination with a color television receiver and a video tape recorder. Signals representing live scenes picked up by the video camera are transmitted in the form of line sequential video signals to the television receiver for immediate display and to the video tape recorder for recording and subsequent replay. Color motion picture films may be sensed in the color film converter and converted to line sequential video signals for immediate display on the receiver tube or for recording on video tape. The recorded line sequential signals are subsequently replayed and displayed in the manner described above with two colors being displayed during each horizontal line scan interval of the display device.

Figure 2:
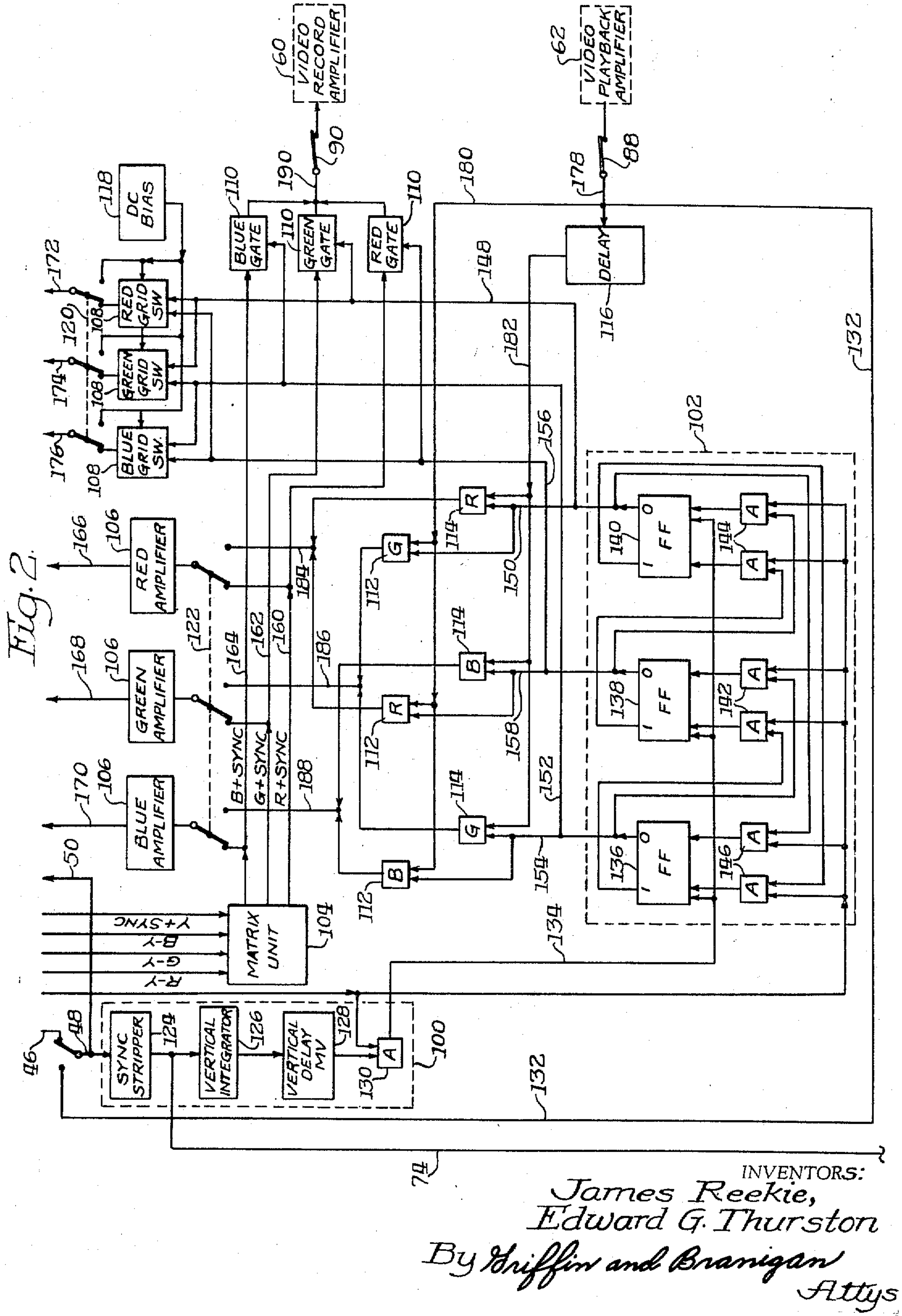

Other features of the invention and its mode of operation will become apparent upon consideration of the following description when taken in conjunction with the accompanying drawings in which:

FIG. 1 is a schematic diagram of a system including a preferred embodiment of the invention; and FIG. 2 is a schematic diagram showing details of the matrix, color switching, and sync circuits.

As shown in FIG. 1, a system including a preferred embodiment of the invention comprises a color television receiver 10, a video tape recorder 12, a video camera 14, a color film converter unit 16, and an adapter or interconnecting unit 18.

Receiver 10 is a conventional color television receiver of the type now sold for use in the home. The receiver includes various electronic circuits indicated generally as an RF tuner 20, intermediate frequency stages 22, a detector and first video amplifier 24, a second video amplifier 26, a sync separator and automatic gain control circuit 28, a deflection control circuit 30, a color sync circuit 32, a chrominance circuit 34, a sound circuit 36, an audio amplifier 38, and a loud speaker 40. The receiver also includes a three gun color display tube 42 which may, for example, be a shadow mask tube.

The present invention is not limited to use with the specific receiver 10 but may employ other commercially available color television receivers. Furthermore, the circuits of receiver 10 are all of conventional design and a detailed explanation of each individual circuit is deemed unnecessary. Generally speaking, all that is required is that the television receiver accept standard NTSC signals to simultaneously develop the conventional color difference signals $R-Y$, $G-Y$ and $B-Y$, as well as composite luminance signal $Y$+sync.

Normally, the color difference signals $R-Y$, $G-Y$ and $B-Y$ appearing at the output of chrominance circuits 34 are applied directly to the grids of the red, green and blue electron guns of a display tube 42, while the luminance output signal from the second video amplifier is applied to the cathodes of all three electron guns. However, in accordance with the present invention the color difference and luminance signals are applied to a matrixing unit within matrix, color switching, and sync circuits 44. The reason for this change will become apparent upon consideration of FIG. 2.

Other slight modifications are required in the circuits of receiver 10, as follows. First, the output of the first video amplifier 24 that would normally be applied directly to the sync separator and automatic gain control circuits 28 is disconnected. Instead, the output of the first video amplifier is applied by way of lead 46, switch 48 (FIG. 2), and lead 50, to the sync separator and automatic gain control circuits 28. Secondly, an output lead 52 applies horizontal pulses from deflection circuits 30 to the color switching and sync circuits 44. Finally, the output of sound circuit 36 which would normally be connected directly to the input of audio amplifier 38 is disconnected and is instead connected by way of a lead 54 to a switch 56 in adapter circuit 18. The common terminal of the switch is connected by lead 58 to the input of audio amplifier 38. The reasons for these changes will become apparent when the various modes of operation of the device are explained.

Video tape recorder 12 may be any conventional video tape recorded having the capability of recording black and white video signals. Since the video recorder is of conventional design only the video record and playback amplifiers 60 and 62 and the audio record and playback amplifiers 64 and 66 are shown.

The present invention is intended for use in a complete home entertainment system hence it includes a color video camera 14 and a color film converter 16. The video camera comprises, for example, a vidicon tube 68 having a color filter 70 on the face thereof. The filter comprises a series of horizontally disposed red, green, and blue filter elements positioned such that on each horizontal scan made by the scanning beam of the vidicon tube it senses the output from one line filter only so that the output from the vidicon tube is line sequential. That is, the output resulting from one horizontal scan represents red color information, the output resulting from the next horizontal scan represents green color information, the next represents blue information, the next represents red, and so forth. Deflection control circuits 72 control the horizontal and vertical deflection of scanning beam of the vidicon tube and the deflection control 72 are in turn controlled by sync signals derived from the NTSC signal broadcasts from some remote television transmitting station. The NTSC signal is received by receiver 10 and processed by color switching and sync circuits 44 and appears on lead 74 from whence it is applied by way of lead 76 to deflection control circuit 72 and video amplifier 78.

The sync signals on lead 76 as well as the output from vidicon tube 68 are amplified by video amplifier 78 and applied over a lead 80 to a switch 82. From switch 82 the output of the video camera passes through a gamma correction circuit 84 and a video amplifier 86 to a pair of switches 88 and 90. The use of these switches and the output of the video camera will be described subsequently when considering the various operating modes of the invention.

The video camera may take many forms other than that described above. The camera might simultaneously generate tricolor signals which may be sequently sampled to product line sequential signals.

A microphone 91 is provided for sound pick-up from the scene viewed by the video camera. The output from the microphone is applied to a switch 93 and when the switch is in proper position the output from the microphone passes over lead 95 to the audio record amplifier 64.

The color film converter 16 is substantially identical to the video camera 14 and like parts have been assigned like reference numerals. In addition, the color film converter includes conventional apparatus, generally designated 92 for projecting light from a source 94 through a motion picture film 96 onto the face of the vidicon tube 68'. A suitable optical or magnetic sound track pickup head 97 is provided. The sound signal outptu from this head is applied to input terminals of switches 56 and 93 which may be manually set to apply the sound to speaker 40 through amplifier 38 and/or to apply the sound signal to audio record amplifier 64.

FIG. 2 shows details of the matrix, color switching, and sync circuits 44. These circuits include a field discriminator 100, a sequencing unit 102, a matrix unit 104, three color display tube input amplifiers 106, three grid bias control switches 108, three record output gates 110, a first set of three display control gates 112, and a second set of display control gates 114. The switching and sync circuits 44 also include a delay line 116, a source of DC grid bias 118, a manually operable grid bias control switch 120, a manually operable video display control switch 122, and a manually operable sync signal switch 48.

The field discriminator 100 includes a sync stripper 124, a vertical integrator 126, a vertical delay 128, and a logical AND gate 130. The purpose of the field discriminator is to develop an output pulse from AND gate 130 coincident with the occurrence of some predetermined, horizontal sync pulse during the vertical blanking interval of only one of the two fields comprising each frame. The reason for this will become apparent after the other circuits shown in FIG. 2 have been considered.

Sync stripper 124 receives composite picture and sync signals from either one of two sources depending upon the condition of switch 48. When switch 48 is in one position composite video picture and sync signals from the output of the first video amplifier 24 are applied over lead 46 to the input of the sync stripper. When switch 48 is in the other position composite video picture and sync signals played back through the video tape recorder pass through switch 88 and over lead 132, through switch 48 to the input of the sync stripper. Regardless of the source of the composite video and sync signals, the sync stripper removes the picture signals and produces at its output only the sync signals.

It is well known that the frequency of operation of the local horizontal oscillator in a television receiver is controlled to be in substantial synchronism with the horizontal pulse content of the received broadcast synchronizing signals. Further, this operation is not affected by the appearance of the serrated pulses during the vertical sync portion of the vertical blanking interval. It is a further well known characteristic of standard NTSC interlacing technique that the relative position of the vertical sync portion with respect to the horizontal pulse signals is shifted by one-half of a horizontal line period during the vertical blanking interval of one field of a frame as compared to that of the subsequent field.

Vertical integrator 126 develops an output pulse in response to the occurrence of the vertical sync (serrated pulse) portion of the received sync signals. Delay element 128 is adjusted so that the resultant delayed response to the output of integrator 126 coincides with one of the horizontal pulses produced during the vertical blanking interval of one field. Accordingly, the output of delay element 128 will not be coincident with a horizontal sync pulse during the vertical blanking interval of the subsequent field. In fact, during the subsequent vertical blanking interval the output signal from delay element 128 occurs substantially midway between horizontal pulses.

The output of delay element 128 is applied to one input of AND gate 30 and horioznital pulses derived from the deflection circuits 30 of the receiver are applied to the other input of the AND gate to detect the coincidence of pulses and generate an output signal once every other vertical blanking interval or once each frame.

Generally speaking the field discriminator may comprise any means for producing an output signal during only one of the two vertical sync signal periods occurring during each frame, the discriminator 100 being described herein only as one preferred example. Its primary purpose is to index sequence unit 102 to a predetermined state once each frame to thereby preserve proper color interlace and avoid ambiguity between record and playback as described in the application of Edward G. Thurston, Ser. No. 538,816, filed concurrently herewith.

The output signal from AND gate 130 is applied over lead 134 to the sequencing unit 102 to set the sequencing unit to a predetermined condition. The sequencing unit 102 includes three flip-flops 136, 138, and 140. These flip-flops are of the type commonly used in digital control circuits. The flip-flops are connected in a closed ring shift register arrangement. The outputs of flip-flop 136 are connected through a pair of AND gates 142 to the inputs of flip-flop 138. The outputs of flip-flop 138 are connected through a pair of AND gates 144 to the inputs of flip-flop 140, and the outputs of flip-flop 140 are connected through a pair of gates 146 to the inputs of flip-flop 136. Sequencing unit 102 operates as follows. The output signals from AND gate 130 are applied by way of lead 134 to the "one" input of flip-flop 136, the "one" input of flip-flop 138, and the "zero" input of flip-flop 140. As long as flip-flop 140 is set to its zero state it produces an output signal which is applied over lead 148 to condition the green record gate 110 and turn on the red and green grid switches 108. The zero output of flip-flop 140 is also applied over lead 50 to condition one input of red gate 114 and one input of green gate 112.

The horizontal sync pulses appearing on lead 52 are applied to one input of each of the gates 142, 144, and 146. Therefore, upon occurrence of the next succeeding horizontal sync pulse the binary 1 in flip-flop 136 is transferred to flip-flop 138, the binary 1 in flip-flop 138 is transferred to flip-flop 140, and the binary 0 in flip-flop 140 is transferred around to flip-flop 136. As long as flip-flop 136 stores a zero it produces an output signal on lead 152 to condition blue gate 110 and to turn on the green and blue grid switches 108. Also, the output from the flip-flop 136 is applied over lead 154 to condition green gate 114 and blue gate 112.

Upon occurrence of the next horizontal shift pulse the binary zero in flip-flop 136 is transferred to flip-flop 138, the binary 1 in flip-flop 138 is transferred to flip-flop 140, and the binary 1 in flip-flop 140 is transferred to flip-flop 136. As long as flip-flop 138 stores a zero signal it produces an output signal on lead 156 to turn on the blue and red grid switches 108 and condition red gate 110. Furthermore, the output of flip-flop 138 is also applied to one input of blue gate 114 and one input of red gate 112 to condition both of these gates.

Upon occurrence of the next horizontal sync pulse on lead 152 the gates 142, 144, and 146 are again conditioned and the binary values in the flip-flops shifted to the next stage. After this shift has been completed the flip-flops 136 and 138 again store binary ones and the flip-flop 140 once again stores a binary zero. Accordingly, it is seen that the sequencing unit has three distinct states and is sequentially shifted from one of these states to the next by the horizontal sync pulses appearing on lead 52.

In summary, as unit 102 sequencies from one state to the next it sequentially produces a signal at each of its outputs with each output signal occurring for an interval of time corresponding to the interval of time between horizontal sync pulses. The output signals from the sequencing unit selectively condition the gates 110 in the sequence green, blue, red, green, etc. The output signals from the sequencing unit condition two of the grid switches 108 at a time in the switching sequence red-green, green-blue, blue-red, red-green, etc. The output signals from the sequencing unit condition the gates 112 in the sequence G, B, R, G, etc., and concurrently therewith condition the gates 114 in the sequence R, G, B, R, etc.

These sequences continue repetitively throughout both fields of each frame. However, if any of the horizontal sync pulses on lead 52 should be lost, or if a spurious horizontal sync pulse should occur, the proper color interlace pattern and color registration would be lost and a pronounced line structure would appear on the face of the display tube. At this point it may be noted that the best color interlace for a two-color-per-line scan system is obtained when the first line of the first field of each frame begins with the first pair of a three pair display sequence, and the first line of the second field in each frame begins with the second pair of the three pair sequence. A three pair sequence as used herein is any preselected one of the three permutations of the three combinations of RGB taken two at a time. For example, if sequence 102 control is arranged such that the colors RG are displayed during the first line of the first field, then the first line of the second field should begin with GB for a display sequence RG, GB, BR. It so happens that the number of horizontal sync pulses on lead 52 during field one is just sufficient to step sequencer 102 to the GB position (FF136=0; FF138=1; FF140=1) for the first line of field 2 if the sequence control is set to display RG during the first line of field 1. The output from AND gate 130 insures that the sequencer is set to control the display of RG during the first line of each new frame, i.e., field 1 of each frame.

The various modes of operation of the device will now be described in order that the overall operation may be better understood.

*Broadcast display and record mode*

When operating in the broadcast display and record mode the device displays on the face of display tube 42 the video information received from a remote broadcast station with the accompanying sound being applied to the loudspeaker 40. In addition, the video picture and sync signals are converted to line sequential signals and recorded by video record amplifier 60 while the accompanying sound signals are recorded by audio record amplifier 64.

The standard NTSC signal is received at the antenna of television receiver 10 and passes through RF tuner 20. Sound circuits 36 eliminate the video signals and pass the sound signals over lead 54, through switch 56, over lead 58, and through audio amplifier 38 to the loudspeaker 40. The sound signals on lead 54 also pass over switch 93 and lead 95 to the audio record amplifier 64. The video portion of the incoming signal passes through IF stages 22 and the detector and first video amplifier 24 and is applied to the second video amplifier 26, the color sync circuits 32, and chrominance circuits 34. Circuits 32 and 34 develop the color difference signals $R-Y$, $G-Y$ and $B-Y$ and these signals are applied to matrix unit 104 in FIG. 2. The output of the second video amplifier is the luminance+sync signal and this signal is also applied to the matrix unit 104.

In order to control the deflection of display tube 42, the output of the first video amplifier 24 passes over lead 46 to the switch 48 (FIG. 2) and from this switch over the lead 50 back into the sync separator circuit 28. The output of circuit 28 is applied to the deflection control circuits 30 to control the scan of the electron beams in tube 42.

The matrix unit 104 combines the color difference signals with the luminance+sync signal to simultaneously develop three composite color signals $R$+synch, $G$+sync, and $B$+sync on the leads 160, 162, and 164, respectively.

When operating in the broadcast display and record mode the manual switch 122 is set to the position shown in FIG. 2. The $R$+sync signal on lead 160 passes through switch 122, red amplifier 106, and lead 166 to the cathode of the red electron gun in the display tube. The signal $G$+sync appearing on lead 162 passes through switch 122, green amplifier 106, and over lead 168 to the cathode of the green electron gun. The signal $B$+sync appearing on lead 164 passes through switch 122 and blue amplifier 106 from whence it passes over lead 170 to the cathode of the blue electron gun.

As previously mentioned, the television receiver 10, before modification, normally combines the color difference signals and the luminance signal in the display tube by applying the color difference signals to the grids and applying luminance signals simultaneously to all cathodes. In accordance with the present invention the combination of the luminance signal with each of the color difference signals is accomplished by matrix unit 104 and the resulting color signals R, G and B are applied to individual cathodes. The grids of all electron guns are maintained at a positive potential by DC bias source 118. The switch 120 is set away from the position shown in FIG. 2 so as to connect DC bias source 118 to leads 172, 174 and 176. These leads connect with the three grids of the display tube 42. Therefore, the electron guns of the display tube simultaneously write all three colors during each line scan.

By matrixing the color difference signals and the luminance signals externally of the display tube, as is done by matrix 104, it is possible to develop the color signals R, G and B at a readily accessible point and in a form in which they can be recorded. In order to record the broadcast program at the same time it is displayed on tube 42, switch 90 connects the outputs of gates 110 to the video record amplifier 60 of the tape recorder. The $R$+sync, $G$+sync and $B$+sync signals appearing on leads 160, 162 and 164 are applied to the red, green and blue gates 110. As previously explained, these gates are controlled by sequencing unit 102 so that only one of the gates is conditioned to pass signals during a given line scan interval. Although color information for three colors appears simultaneously on leads 160, 162 and 164, only one of the gates 110 is conditioned during a given line scan interval. That is, the red, green and blue gates 110 present a single color per line, line sequential output to the video tape recorder. Depending upon which one of the gates 110 is conditioned, the color information and sync signal from one of the leads 160, 162 and 164 passes through the conditioned gate, switch 90, and record amplifier 60 and is recorded on the magnetic tape in the video tape recorder.

The gates 110 may be conditioned to pass signals in any desired sequence. Furthermore, it is a matter of design choice as to which color is the first one recorded during each frame. For the specific embodiment shown in FIG. 2, the green color signal is the first one recorded during each frame with the color signals being recorded in the sequence G, B, R, G, etc. This sequencing of the gates 110 continues throughout the first field of each frame and carries over so as to continue into the second field of each frame. During the vertical blanking interval between fields the gates 110 are sequentially operated and sync signals occurring during this interval are recorded.

Since there are 263 horizontal sync pulses in each first field of a frame, and since sequence unit 102 is shifted from one state to the next in response to each horizontal sync pulse, it follows that the sequence unit is set to its second state by the 263rd pulse, assuming that the first pulse set the sequence unit to its first state. Therefore, for the embodiment shown, the first signal recorded during the second field of each frame is a blue color signal.

As previously stated, it is a matter of design choice as to the sequence in which the gates 110 are operated, and which one of the gates is opened to record the first color signal. However, there must be a definite fixed relationship between the sequencing of gates 110 and the sequencing of gates 112 and 114 and switches 108. For example, assuming the recording sequence GBRG with the green color signal being first recorded, then the gates 112 must be operated in the sequence GBRG, the gates 114 must be operated in the sequence RGBR, and the switches 108 must be operated in the sequence RG, GB, BR, RG. If this relationship is not maintained then the color signals on playback will be applied to the wrong color electron guns.

*Playback mode*

When operating in the playback mode the line sequential signals recorded by the video tape recorder are sensed by video playback amplifier 62 and displayed by display tube 42. Manual switch 88 is set to connect the output of the video playback amplifier to the input lead 178 of the color switching and sync circuits 44. The signals appearing on lead 178 are applied by way of lead 132 to the switch 48. Switch 48 is set so as to connect lead 132 to lead 50 and the input to the sync stripper. The sync stripper 124 separates the video information from the sync signals and uses the sync signals in the manner previously described to develop the odd or even field indicator pulses at AND gate 130.

The composite video and sync signal at switch 48 also passes by way of lead 50 to the sync separator 28 in FIG. 1. The circuit 28 also separates the video information from the sync signals and applies the sync signals to deflection controls 30 where they control the horizontal and vertical scanning of the electron beams in display tube 42.

The deflection circuits 30 produce horizontal sync pulses on lead 52 and these are applied to the field discriminator 100 and the sequencing unit 102 to control the sequential operation of the sequence unit in the manner previously described.

When the composite color and sync signals on leads 160, 162 and 164 are converted to line sequential signals and recorded, a problem occurs when the signals are played back and displayed. If the line sequential color signals were read back from the tape and applied to the display tube 42 with one color being applied during each line scan period, the intensity of the display would by only one-third that of the display of the original signals appearing on leads 160, 162 and 164. In addition, a very pronounced raster would appear on the display tube and there would be inadequate color blending. These problems are resolved to a satisfactory degree by provision of the delay line 166 and the two sets of gates 112 and 114.

On playback, the line sequential signals at lead 178 are applied over lead 180 to an input of each of the gates 112R, 112G and 112B. The line sequential playback signals appearing on lead 178 are also applied to delay line 116. This delay line introduces a delay equal to the duration of one horizontal line scan interval. The delayed signals are applied over lead 182 to one input of each of the gates 114R, 114G and 114B. As previously explained, an output signal from flip-flop 140 simultaneously conditions gates 112G and 114R during every third line scan interval. Furthermore, an output signal from flip-flop 138 simultaneously conditions gates 112R and 114B during every third line scan interval whereas an output signal from flip-flop 136 simultaneously conditions gates 112B and 114G during every third line scan interval. Gates 112R and 114R have their outputs connected in common to a lead 184 while gates 112G and 114G have their outputs connected in common to a lead 186, and gates 112B and 114B have their outputs connected in common to a lead 188. When operating in the playback mode the switch 122 is set to connect the leads 184, 186 and 188 to the inputs of the red, green, and blue amplifier 106, respectively.

The two color per line display operation may be best understood by considering a specific example. Assume that the first line scan of a field is about to begin. A line sequential signal representing green color information is played back from the recorder and appears on lead 178. At this time the flip-flop 140 will be in its reset or zero condition thus conditioning gates 112G and 114R. The green color signal passes over lead 180, through conditioned gate 112G, over lead 186, and through switch 122 and green amplifier 106 to the lead 168 which is connected to the cathode of the green electron gun of display tube 42.

The output of the flip-flop 140 is also applied over lead 148 to condition the green and red grid switches 108. These switches then pass the DC bias through switch 120 to the leads 172 and 174 to turn on the grids of the red and green electron guns. Since the green cathode is receiving video signals and since the green grid is turned on, the green electron gun writes one line of green information.

The green signal at lead 178 is applied to delay line 116 concurrently with its application to the gate 112G. However, the delay line 116 has a delay equal to one horizontal line scan interval hence the green color signal does not begin to emerge from delay line 116 until the beginning of the next line scan period. Concurrently with the beginning of the next line scan period a line sequential signal representing blue color information appears at input 178. The blue color signal passes over lead 180 to one input of gate 112B. Simultaneously therewith, the green color signal appears on lead 182 and is applied to gate 114G. In the meantime, the sequence unit 102 has been advanced by a horizontal sync pulse on lead 52 so that the flip-flop 136 is in its zero state thus conditioning both gates 112B and 114G. The green color signal moves through 114G, lead 186, and green amplifier 106 to the green electron gun cathode. Simultaneously, the blue signal from 112B passes over lead 188 and through blue amplifier 106 to the blue electron gun cathode. The output of flip-flop 136 appearing on lead 152 conditions both the blue and the green grid switches 108. Accordingly, during this line scan interval both blue and green color information is displayed.

At the beginning of the next line scan interval sequence unit 102 is again advanced by a horizontal sync pulse so that the output of flip-flop 138 conditions gates 112R and 114B as well as the red and blue grid switches 108. The blue signal applied to delay line 116 during the preceding line scan interval appears on lead 182 at the same time a red color signal appears at input 178. The blue signal passes through gate 114B and over lead 188 to the blue amplifier from whence it is applied to the blue cathode. Simultaneously, the red signal on lead 180 passes through gate 112R and over lead 184 to the red amplifier 106 from whence it is applied to the red cathode. Both the red and the blue grids are on so during this line scan interval the display device of 42 displays both red and blue color information.

The next horizontal pulse advances sequence unit 102 so that during the next horizontal line scan interval the flip-flop 140 again conditions gates 112G and 114R and turns on the green and red switches 108. The delayed red signal appearing at the output of delay line 116 passes through 114R and over lead 184 to the red amplifier from whence it is applied to the red cathode. Simultaneously therewith, the next green color signal appears on lead 178 and moves over lead 180 and through gate 112G from whence it passes over lead 186 to the green amplifier 106 and is applied to the green cathode.

From the above description it is seen that each line sequential color signal played back and appearing at lead 178 is displayed during one line scan interval and is delayed until the next consecutive line scan interval at which time it is again displayed so that two colors are displayed during each line scan interval. Furthermore, it should be obvious that on the line scan when the first color for a field is replayed, only one color is displayed. On all succeeding line scans of each field two colors are displayed.

During the playback operation the sound signals picked up by audio playback amplifier 66 pass over lead 200 and switch 56 to amplifier 38 and loudspeaker 40.

*Vidicon camera view and record mode*

In this mode of operation the scenes picked up by vidicon camera 14 are displayed by display tube 42 and simultaneously recorded by the video tape recorder.

As previously explained, the output of video amplifier 78 in the vidicon camera is line sequential in that it comprises composite color and sync signals occurring in the sequence $R$+sync, $G$+sync, $B$+sync. This is the same form as the line sequential signals produced at the common output 190 of the gates 110 (FIG. 2) when the device is operating in the broadcast display and record mode. Therefore, the output of the camera may be applied without change to the video record amplifier 60. The circuit is from video amplifier 78, lead 80, switch 82, gamma corrector 84, amplifier 86, and switch 90, now closed, to record amplifier 60.

The output signals from the vidicon camera are of the same form as the signals played back by the video recorder during the playback mode described above and, accordingly, are displayed in the same manner as when the device is operating in the playback mode. Switch 88 is positioned to connect the output of amplifier 86 to lead 178.

The camera output signals are applied from lead 178 to delay line 116, and over lead 180 to the gates 112. Therefore, when the camera is operating the viewed scene is displayed on tube 42 with two colors being displayed during each horizontal line scan interval. Since the display circuits operate the same in this mode as in the playback mode previously described, a description of their operation in the camera view mode would be repetitious.

In the description of FIG. 1 it was noted that the synchronizing signals for controlling camera 14 are derived from standard NTSC signals broadcast from some remote television broadcast station. That is, camera 14 does not have to contain the precise and expensive signal generators for producing sync signals.

The NTSC signal received by the television receiver antenna follow a path through tuner 20, IF stages 22, and the detector and first video amplifier 24 to lead 46.

Switch 48 is set as shown in FIG. 2 so the incoming signals pass through the switch 48 to lead 50 and sync stripper 124.

From lead 50 the incoming NTSC signal goes to the sync separator circuits 28 and the display tube deflection controls 30 to control the scanning of the electron beams of the display tube.

The sync stripper 124 removes the video picture portion of the NTSC signal and passes the sync signals over lead 74 from whence it is applied via lead 76 to control the scanning of the electron beam in the vidicon tube 68. These sync signals are also added to the vidicon camera output in amplifier 78 so that they may be recorded with the signals representing the scene viewed by the camera.

*Color film display and record mode*

The present invention operates in the color film display and record mode to simultaneously display on tube 42 and record on video tape representations of the images contained on a color motion picture film 95. As previously explained, the operation of the color film converter 16 is substantially identical to the operation of the camera 14 when the camera is operating in the camera view and record mode. In fact, vidicon camera 14 could be mechanically positioned in proper registration with the optical system of converter 16 and thus provide for a dual function with an attendant saving in cost. Switch 82 is set to connect the output of video amplifier 78′ to the input of gamma corrector 84. Once this change is made, the video output signals of color converter 16 are displayed and recorded in the same way as described above for the video camera and record mode.

Switch 93 is set to connect the output of sound pickup 97 to the input of audio record amplifier 64 and switch 56 is set to apply the output of sound pickup 97 to audio amplifier 38 and loudspeaker 40.

It is obvious from the foregoing description that the present invention provides a novel method and apparatus for recording and subsequently displaying either broadcast signals conforming to NTSC standards or locally produced signals. By converting the video broadcast signals to color difference signals and luminance signals, and by matrixing the color difference signals and luminance signals externally to the color display tube it is possible to develop composite color signals which may be recorded in the line sequential mode without the need for a subcarrier or other such methods for recording separate chrominance and luminance information. This greatly reduces the required bandwidth and enables color video picture information to be recorded with any video tape recorder having the capability of recording black and white video picture signals, even those having considerably reduced bandwidth.

By the provision of the delay line which permits each line of color information to be displayed during two consecutive line scan intervals with two colors being displayed during each scan, the luminous intensity of the display can be brought up to two-thirds that of a standard broadcast signal display, and this may be further increased within the range of available brightness adjustment of a conventional receiver to where the resultant display is of comparable intensity to that of a conventional display. With a one color per line display such comparable brightness can not be reasonably achieved.

Although the vertical resolution is less than for black and white display with the same video tape recorder, it is nevertheless vastly superior to that characteristic of a single color per line display under otherwise similar conditions and the color content of the display offsets the lower resolution and gives a display which is acceptable for most conditions.

Although the invention has been described in connection with a single preferred embodiment, it will be apparent that various modifications may be made which fall within the spirit and scope of the invention. For example, a further delay line having a two line scan interval delay may be provided to control another set of gates similar to gates 112 and 114 whereby three colors may be displayed during each line scan interval. Although this would increase the luminous intensity of the display, it would also increase the circuitry required. As a further modification, a three-gun Chromatron tube rather than a shadow mask tube may be employed as the color display device. With these modifications in mind, it is intended to be limited only by the appended claims.

The embodiments of the invention in which an exclusive property or privilege is claimed are defined as follows:

1. The method of displaying color video signals broadcast in NTSC form, said method comprising the steps of:
- converting said video signals to line sequential signals,
- recording said line sequential signals,
- playing back said line sequential signals,
- applying said playback line sequential signals to a display device without delay,
- delaying said playback line sequential signals for an interval of time equal to a line scan period of said display device,
- and applying said delayed playback line sequential signals to said display device whereby each playback line sequential signal is displayed by said display device during two consecutive line scan periods and two line sequential signals are displayed during each line scan period.

2. The method as claimed in claim 1 wherein the conversion of said video signals to line sequential signals includes the steps of converting said video signals to:
- color difference signals and a luminance signal,
- combining said color difference signals and said luminance signal to produce simultaneous color signals, and
- sequentially sampling said color signals to obtain said line sequential signals.

3. Means for displaying color video signals broadcast in NTSC form, said means comprising:
- a display device having a line scan interval,
- a television receiver responsive to said color video signals for producing a set of color difference signals and a composite luminance and sync signal
- means for combining said color difference signals and said luminance and sync signal to sequentially produce a set of composite color and sync signals during each of said line scan intervals,
- a video tape recorder,
- means for sequentially gating one of said composite color and sync signals to said recorder during each line scan interval to thereby record said composite color and sync signals as line sequential signals,
- playback means for reproducing said line sequential signals one color at a time,
- and means for applying said reproduced signals to said display device.

4. Means as claimed in claim 3 wherein said means for applying said reproduced signals to said display device includes two parallel connected channels,
- and means in one of said channels for delaying said reproduced signals for a period of time equal to said line scan interval whereby each of said reproduced signals is applied to said display device during two consecutive line scan intervals and two of said reproduced signals are applied to said display device during each line scan interval.

5. The combination comprising:
- means responsive to broadcast NTSC color signals for producing line sequential color signals,
- means for recording and playing back said line sequential signals,
- a color display device having a line scan interval,
- means responsive to said playback means for applying a line sequential signal to said display device during the line scan interval in which it played back, and delay means having a delay time equal to said line scan interval, said delay means being responsive to said playback means for applying delayed line sequential signals to said display device whereby two line sequential color signals are displayed during each line scan interval and each line sequential color signal is displayed during two consecutive line scan intervals.

6. The combination as claimed in claim 5 wherein said display device is a three gun display tube, said means responsive to said playback means including a set of three sequentially operated gates for gating said line sequential signals to said guns, a further set of three sequentially operated gates each of which receives output signals from said delay line and each having an output connected to one of said three guns, and means responsive to said playback means for sequentially operating one gate at a time in each of said sets.

7. The combination as claimed in claim 6 wherein said means for sequentially operating one gate at a time in each of said sets comprises a three stage shift register.

8. A color video display device comprising:

a color video display tube having first, second, and third electron beam producing guns for writing first, second and third colors on the face of said display tube, said guns each having first and second control electrodes, deflection control circuits for controlling said guns to write on said face in a sequence of horizontal line scans, a source of line sequential video signals for sequentially producing signals representing horizontal lines of color information in said first, then said second, and then said third color, delay means having a delay time equal to the time required for one of said horizontal line scans, first and second sets of gates, each set having a gate corresponding to each of said colors, means connecting said source of line sequential signals to each gate in said first set and to the input of said delay means, means connecting the output of said delay means to each of said gates of said second set, means connecting the output of each gate in each set to one of said first control electrodes of one of said electron beam guns, the outputs of the gates corresponding to a particular color being connected to a control electrode of the electron beam gun which writes said corresponding color, sequence control means, and means connecting said sequence control means to the gates in both said sets whereby said gates are operated in the sequence first color gate of said first set concurrently with the second color gate of said second set, second color gate of said first set concurrently with the third color gate of said second set, third color gate of said first set concurrently with the first color gate of said second set, whereby each line of color information produced by said source is displayed during two consecutive horizontal line scans and two colors are written by said electron beam guns during each horizontal line scan.

9. A color video display device as claimed in claim 8 and further comprising:

a source of bias voltage connected to three control gates, there being one control gate corresponding to said colors, means connecting the output of each control gate to one of said second control electrodes of said electron beam guns, and means connecting said sequence control means to said control gates to thereby condition said gates two at a time and apply bias voltage to the second electrodes of the two electron beam guns which concurrently receive color information from said first and second sets of gates.

10. A color video display device as claimed in claim 8 wherein said source of line sequential video signals includes means producing sync signals, and means responsive to said sync signals for controlling said deflection control circuits and said sequence control means.

11. A color video display device as claimed in claim 8 wherein said source of line sequential video signals includes a video camera.

12. A method of displaying line sequential color signals with a three color display device having a line scan period, said method comprising the steps of:

applying said line sequential color signals to said display device, delaying each of said line sequential color signals for an interval of time corresponding to a line scan period, and applying said delayed line sequential color signals to said display device, whereby each line sequential color signal is displayed during two line scan periods and two line sequential color signals are displayed during each line scan period.

13. A method of recording color video signals broadcast in NTSC form, said method comprising the steps of:

decoding said NTSC signals to simultaneously produce the color difference signals $(R-Y)$, $(B-Y)$ and $(G-Y)$ and a composite luminance and sync signal $(Y+\text{sync})$, combining each of said color difference signals with said luminance and sync signal to simultaneously produce the composite signals $R+\text{sync}$, $B+\text{sync}$, and $G+\text{sync}$, sequentially sampling said composite signals, one signal during each line scan interval, and directly recording said samplied composite signals.

References Cited

UNITED STATES PATENTS

| | | | |
|---|---|---|---|
| 3,267,207 | 8/1966 | Okazaki et al. ---- | 178—5.4 XR |
| 3,372,228 | 3/1968 | Law. | |

ROBERT L. GRIFFIN, *Primary Examiner.*

RICHARD MURRAY, *Assistant Examiner.*

U.S. Cl. X.R.

178—5.2